3,517,269
PROCESS FOR RECOVERING ACTIVE CONCENTRATES RICH IN SENNOSIDES FROM SENNA PODS
Hans Georg Menssen, Geyen, and Hans Honerlagen, Cologne-Braunsfeld, Germany, assignors to A. Nattermann & Cie. GmbH, Cologne-Braunsfeld, Germany
No Drawing. Filed Sept. 7, 1967, Ser. No. 665,954
Claims priority, application Germany, Sept. 8, 1966, N 29,137
Int. Cl. C07g 3/00
U.S. Cl. 260—210                                    5 Claims

ABSTRACT OF THE DISCLOSURE

A process for preparing an active concentrate rich in sennosides from senna drugs which comprises performing a preliminary extraction from the drugs at room temperature by means of an aqueous alcohol or aqueous ketone, the solvents having a concentration of about 87% to 92% by weight, whereupon the treated pods are extracted with cold water, the dry extract being then recovered by known means. The preferred solvent for the preliminary extraction is 90% methanol. Senna preparations are used in medicine as mild laxatives.

---

Drugs derived from senna pods, *Cassia senna* and *Cassia angustifolia*, have been used for centuries as a medicine because of their mild laxative action. The drug is used as a whole or in powder form, as infusion and/or extract, or in the form of the isolated active ingredient.

Many processes are known for the extraction of senna drugs. Partly, senna leaves or senna pods are first extracted with aqueous organic solvents, whereafter either the undersirable inactive substances may be separated from the active ingredients which remain in solution, or the active ingredients are directly precipitated from the solution, for instance by means of metal salts. In the first case, the solution containing the active ingredients, in the second case the precipitate including metal ions, have to undergo further processing in several operations.

Other processes are known, which extract the starting materials with boiling alkaline water with subsequent evaporation to dryness. From the residue, the active ingredients are either extracted, or the by-products are dissolved with a suitable solvent and separated.

In the German Pat. 656,990 a process is described which is distinguished from the above described methods by subjecting senna leaves first to a preliminary extraction so that they are freed from resinous components and chlorophyll preferably per pre-percolation with ether, whereupon they are further treated with ethanol to remove other impurities. The so pre-treated drug is finally extracted with methanol for the recovery of the active ingredient in the form of a concentrate.

The described processes are comparatively time-consuming and operate partly with additions of alkalies, alkaline earths and acids. They are further unsatisfactory as regards the yields and contents of active ingredient in the dry extract.

It is therefore an object of the invention to provide a process for obtaining active concentrates of sennoisides, the effective ingredient in senna drugs, by overcoming the shortcomings of the known processes.

It is a further object of the invention to provide a method for improving the yield of active ingredient in the dry extract made from senna pods.

Other objects and advantages of the process according to the invention will become apparent from the following detailed description.

The present invention is a further development of the process using preliminary extraction with organic solvents and further extraction with other solvents. According to the invention, the preliminary extraction is carried out with aqueous alcohol or aqueous ketone of 87–92% by weight concentration, at room temperature; in a second operation, the so-treated material is further extracted with cold water and that extract is processed to yield a dry extract.

The main advantages of the process according to the invention are that the addition of auxiliary substances as well as the use of elevated temperature can be dispensed with, so that the process becomes extraordinarily simple. From the extract, a dry concentrate of the active ingredient may be prepared by known methods which has long shelf-life, an unusually high content in sennoside, namely 14–20% depending on the content of the starting material. The yields are quite surprising; they are from 60–65% calculated on the sennoside content of the pods. It is furthermore surprising that such yields will only be obtained from senna pods, whereas senna leaves will not give such satisfactory results.

With the active concentrates made from senna pods according to the invention, laxatives can be produced which contain sennosides in unchanged condition which, according to medical experience are of excellent compatibility and which may be made into various medical preparations for administration.

In general, the starting material are the commercially readily available senna pods, which are comminuted mechanically and cut down to the convenient size of 10 mm. The so prepared drug is pre-extracted in a percolator at room temperatures. Before carrying out the extraction, the drug is made to swell for some time.

The extracting solvent is of great importance in the process according to the invention. It should properly disintegrate the pods, dissolve resinous or coloring matter and other undesirable inactive components, without having dissolving power for sennosides or for desirable components present, which could be called co-effectives. Only afterwards in a further operational step, will the sennosides be dissolved out from the pods by means of cold water in a yield as high as possible.

It has been found that the above described desirable conditions can be accomplished by the use of aqueous lower alcohols and ketones, with the proviso that the water contents of the solvents has to remain within fairly narrow limits of about 8–13% by weight. When higher water contents are present, in the solvent used, the yield will decrease, because considerable amounts of the active ingredient, which is highly water-soluble, will become lost in the pre-extraction step. If, on the other hand, the water content of the aqueous solvent is too low, those undesirable inactive ingredients, which are better soluble in water than in organic solvents, are incompletely removed, so that their proportion in the extract will rise and the percentage of the active ingredient in the final dry extract will drop.

From the preliminary extract the solvent can be recovered for instance by distillation, and it has then to be adjusted to the determined water content. The preferred solvent at that stage is 90% methanol.

The following main extraction is carried out with cold water which has a sufficiently high dissolving power for the active ingredients. If hot water were to be used, hydrolysis of the sennosides would take place upon standing for some time. Furthermore, hot water would also dissolve undesirable ingredients from the drug so that the sennoside value in the final extract would again be unsatisfactory.

The process according to the invention will now be described in a specific example, which is given by way of illustration and not of limitation. Many changes in the particulars set forth can be made without departing from the spirit of the invention.

EXAMPLE 100 kg. senna pods with a mean sennoside content of 4% were cut down to 10 mm., introduced into a percolator, and digested for 15 hours at room temperatures with 200 liters of 90% methanol; subsequently they were pre-extracted with 600 liters of the methanol for 6 hours.

After that time, the solvent was removed from the percolator and the pods remained therein. They were then extracted for 8 hours with a total of 1000 liters cold water for obtaining the final extract of active ingredients as a concentrate. The collected aqueous extract was concentrated in vacuo at a maximum temperature of 35° C. and the dry extract was obtained in a vacuum drying oven likewise at a maximum temperature of 35° C.

Obtained were 14 kg. concentrate of active ingredients with 17.7% intact sennosides. Yield: 62% by weight, calculated on the sennoside content of the drug.

It was established that the water content of the solvent in the pre-extraction was of great importance, since it was shown that upon extracting with 96% methanol only 23% of the sennosides, with methanol of 85%, 31% of the sennosides were obtained instead of the yield of 62% mentioned above.

When acetone of 90% was used in carrying out the process according to the invention, the yield was 48.7%.

As mentioned above, the state of the art as it appears from German Pat. 656,990 likewise relates to a double extraction, namely a preliminary extraction to free the starting material from resinous compounds and other undesirable ingredients and a main extraction for obtaining the sennosides in the final concentrate.

For the purpose of comparing the known extraction proccess and the one of the present invention, and to show the improvement brought about by the latter, the following tests were made.

According to the German patent, senna leaves were pre-extracted with 96% alcohol and then extracted completely with methanol. The extract was then evaporated in vacuo. With the use of 100 g. starting material containing 2.43 g. sennosides, an extract amounting to 5.81 g. was obtained with a sennoside content of 0.42 g., corresponding to a yield of 17.3% by weight.

Furthermore, in accordance with the German patent specification—the leaves were first extracted with ether and after an intermediate drying with 96% ethanol. Only after the two preliminary extractions, and a second intermediate drying was the final extraction with methanol effected, the methanol being then evaporated in vacuo. With the complicated double preliminary extraction and two intermediate dryings, it was possible to increase the yield to 30.3%.

In order to make the conditions of the comparison tests more alike, the senna leaves of the German patent were replaced by senna pods, as used in the process of the instant invention. The results of the comparison tests were the following.

From 1 kg. of senna pods with a sennoside content of 40 g., 140 g. dry extract are obtained by the process according to the invention, with a sennoside content of 24.8 g. Following the directions of the example in German Pat. 656,990, the amount of dry extract was 86 g. with a content of sennosides 8.2 g.

The following table shows the test results in tabulated form:

|  | Contents of Sennosides in— | | |
|---|---|---|---|
|  | Pods | Dry extract | Yield |
| Process according to instant invention, percent | 4 | 17.7 | 62 |
| Process according to German Pat. 656,990, percent | 4 | 9.55 | 20.5 |

These figures clearly show that the process of the invention spells a great improvement due to the increase in yield and to the higher content in active ingredient in the final concentrate.

What is claimed is:
1. In a process of obtaining a concentrate of sennosides from senna drugs by multiple extraction, the improvement which comprises subjecting senna pods to a pre-extraction with aqueous alcohol or aqueous ketone having a concentration of 87 to 92% by weight at room temperature, thereby removing the undesirable inactive ingredients, and thereafter extracting the pre-treated pods with cold water and eliminating the water to obtain a dry extract of active ingredients.

2. The process as claimed in claim 1, in which the alcohol is methanol.

3. The process as claimed in claim 1, wherein the pre-extraction is carried out with 90% methanol.

4. The process as claimed in claim 1, wherein the senna pods are first comminuted mechanically and are allowed to soak in solvent used for the pre-extraction, in order to cause swelling of the comminuted pods before the preliminary extraction is effected.

5. The process as claimed in claim 1, wherein senna pods are comminuted and allowed to remain in 90% methanol at room temperature for 15 hours, whereupon they are pre-extracted with more 90% methanol for 6 hours, thus being freed of inactive ingredients, the pods being then extracted with cold water for 8 hours, and finally concentrated and dried in vacuo at a maximum temperature of 35° C.

References Cited

UNITED STATES PATENTS

| 2,794,035 | 5/1957 | Hummel | 260—210 |
| 3,089,814 | 5/1963 | Blaich | 260—210 |
| 3,274,053 | 9/1966 | Halpern et al. | 424—180 |
| 3,364,113 | 1/1968 | Friedmann et al. | 424—180 |

LEWIS GOTTS, Primary Examiner

J. R. BROWN, Assistant Examiner